United States Patent
Yamaguchi et al.

(10) Patent No.: US 7,365,281 B2
(45) Date of Patent: Apr. 29, 2008

(54) WATERPROOF/DRAINAGE STRUCTURE FOR A CASING, AND ELECTRONIC DEVICES

(75) Inventors: Shingo Yamaguchi, Kawasaki (JP); Kohei Chouraku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 314 days.

(21) Appl. No.: 11/291,776

(22) Filed: Dec. 2, 2005

(65) Prior Publication Data
US 2007/0074473 A1    Apr. 5, 2007

(30) Foreign Application Priority Data
Aug. 31, 2005  (JP)  .............. 2005-252363

(51) Int. Cl.
*H01H 13/06*  (2006.01)
(52) U.S. Cl. ............... 200/302.1; 200/5 A; 200/341; 200/302.2
(58) Field of Classification Search .......... 200/5 A, 200/512, 517, 302.1–302.3, 341; 341/20, 341/22; 345/168, 169; 400/472, 496
See application file for complete search history.

(56) References Cited

U.S. PATENT DOCUMENTS

| | | | | |
|---|---|---|---|---|
| 4,885,443 A | * | 12/1989 | Simcoe et al. | 200/296 |
| 5,681,122 A | * | 10/1997 | Burke | 400/472 |
| 5,704,467 A | * | 1/1998 | Jarvis | 200/302.2 |
| 5,734,136 A | * | 3/1998 | Newcomer et al. | 200/5 A |
| 6,355,890 B1 | * | 3/2002 | Kuroda | 200/5 A |
| 6,437,267 B1 | * | 8/2002 | Imai | 200/302.1 |
| 6,443,644 B1 | * | 9/2002 | Takeda et al. | 400/490 |
| 6,657,147 B2 | * | 12/2003 | Tsutsui et al. | 200/517 |
| 7,087,850 B1 | * | 8/2006 | Murzanski | 200/302.1 |
| 7,186,938 B2 | * | 3/2007 | Ito | 200/512 |
| 7,230,195 B2 | * | 6/2007 | Ohnishi | 200/302.1 |
| 7,235,755 B2 | * | 6/2007 | Wang | 200/512 |

FOREIGN PATENT DOCUMENTS

| | | |
|---|---|---|
| JP | 08-180760 | 7/1996 |
| JP | 2000-307697 | 11/2000 |

* cited by examiner

*Primary Examiner*—Michael A Friedhofer
(74) *Attorney, Agent, or Firm*—Arent Fox, LLP.

(57) ABSTRACT

Provided is a waterproof/drainage structure for a lower casing (11) having a plurality of pushbuttons (16) on a surface thereof. The waterproof/drainage structure has a cover member (14) forming the surface and provided with a plurality of button holes (14a) the plurality of pushbuttons (16), and a sheet portion (17) retaining the plurality of pushbuttons (16) at predetermined positions. The waterproof/drainage structure includes a button unit (15), in which the sheet portion (17) is arranged along a back surface (14b) of the cover member (14) and in which an outer peripheral portion of the sheet portion (17) is held in close contact with the cover member (14), with the pushbuttons (16) being inserted in button holes (14c) of the cover member (14). The sheet portion (17) is provided with a groove-like drainage channel (22) having a channel portion that is opposed to each of the pushbuttons (16) and is larger than a surface area within a maximum outer periphery of the pushbuttons (16).

18 Claims, 16 Drawing Sheets

(a)

(b)

WATERPROOF/DRAINAGE STRUCTURE FOR A CASING, AND ELECTRONIC DEVICES

BACKGROUND OF THE INVENTION

1. Field of the Invention

The present invention relates to a waterproof/drainage structure for a casing which is suitably used for electronic devices and the like having a pushbutton such as a notebook PC, a portable telephone, a transceiver, an electric reel, kitchenware, and a doorbell, and to an electronic device using the same.

2. Description of the Related Technology

In recent years, various functions are required of electronic devices relating to Information Technology (IT), such as a portable telephone and a personal computer. Of those, one of the functions frequency demanded by users is the waterproof function for the area around a pushbutton.

Conventionally, there have been proposed various techniques waterproofing the area around a pushbutton of an electronic device. For example, there has been proposed a key pad for waterproof appliance which retains: a sheet portion affixed onto the back surface of a casing of an electronic device; and a plurality of pushbuttons provided in the sheet portion, the key pad including an outer frame portion surrounding all of the pushbuttons, and a draining groove provided in the outer frame portion (refer to Patent Document 1 for example).

Further, there has been proposed a technique in which a casing of a portable telephone is provided with a discharge hole discharging water that has entered the interior (refer to Patent Document 2 for example).

Further, there has been proposed a waterproofing technique for a portable telephone having key buttons, a sheet, and contacts, the technique involving: dividing the portable telephone into an exterior appearance portion composed of the key buttons and the sheet and a function portion composed of the sheet and the contacts; and hermetically sealing the exterior appearance portion and the function portion separately from the outer and inner sides of the casing (see, for example, Patent Document 3).

[Patent Document 1] JP 08-180760 A
[Patent Document 2] JP 2000-307697 A
[Patent Document 3] JP 2001-148726 A

SUMMARY OF THE INVENTION

However, in the conventional casing waterproofing techniques, water, dust, or the like entering the space between the casing and the sheet portion retaining the pushbuttons is scattered and deposited over a wide area of the sheet portion, making it difficult to discharge such water or dust to the outside.

Water, dust, or the like rarely exerts an adverse influence on internal electronic devices even when it remains in the space between the casing and the sheet portion. However, there is a fear that the stroke of the pushbuttons may be hindered by mold occurring due to the water remaining in the interior, dust, or the like, leading to a deterioration in the operability of the pushbuttons.

The present invention has been made in view of the problem described above, and therefore it is an object of the present invention to provide a waterproof/drainage structure for a casing and an electronic device, which make it possible to efficiently discharge water, dust, or the like that has entered a space between a cover member of the casing and a sheet portion retaining pushbuttons.

In order to solve the above problems, the present invention adopts the following measures.

(1) The present invention provides a waterproof/drainage structure for a casing having a plurality of pushbuttons on a surface of the casing, including: a cover member forming the surface and provided with a plurality of button holes; and a button unit having the plurality of pushbuttons and a sheet portion retaining the plurality of pushbuttons at predetermined positions, the sheet portion being arranged along the back surface of the cover member and having its outer peripheral portion held in close abut with the cover member, the pushbuttons being inserted in the button holes of the cover member, wherein the sheet portion is provided with a groove-like drainage channel having a channel portion that is opposed to a back surface of each of the plurality of pushbuttons and is larger than a surface area within a maximum outer periphery of the pushbuttons.

According to the present invention, water, dust, or the like that has entered the space between the cover member and the sheet portion of the button unit from the gap between the pushbuttons and the cover member is collected to the groove-like drainage channel provided in the sheet portion. This allows water, dust, or the like to readily flow through the drainage channel.

Accordingly, water, dust, or the like that has entered the space between the cover member and the sheet portion of the button unit from the gap between the pushbuttons and the button holes can be efficiently discharged to the outside. As a result, it is possible to prevent the stroke of the pushbuttons from being hindered by mold occurring due to water, dust, or the like, thereby preventing a deterioration in the operability of the pushbuttons.

(2) The drainage channel has: wide channel portions that are respectively opposed to the plurality of pushbuttons and are larger than a surface area within the maximum outer periphery of the pushbuttons; and connection channel portions connecting the wide channel portions to one another, and the path connecting the wide channel portions and the connection channel portions together is formed so as to be drawn in one stroke.

In this case, there is no dead-end portion in the midstream of the drainage channel, whereby water, dust, or the like in the drainage channel can be discharged to the outside even more efficiently.

(3) The groove-like drainage channel can be formed by a string-like protrusion protruding on the sheet portion. In this case, the drainage channel can be easily formed. It should be noted that the drainage channel can be also formed by providing a recessed groove in the sheet portion.

(4) It is preferable that the sheet portion be provided with a drainage hole discharging water exiting the drainage channel to the outside, and that the drainage hole be provided with a lid that can be freely opened and closed.

In this case, the lid is opened only when discharging water, dust, or the like in the drainage channel from the drainage hole, and other than when discharging water, dust, or the like, the drainage hole is closed, there by making it possible to prevent water, dust, or the like from entering the drainage channel from the drainage hole.

(5) It is preferable that water repellency treatment be performed on the drainage channel. Examples of the water repellency treatment include application of various water repellency agents such as coatings or waxes of Teflon® or fluororesin. In this case, water in the drainage channel is repelled due to the water repellency treatment to readily flow in the drainage channel, whereby water or the like can be discharged to the outside even more efficiently.

(6) It is preferable that the waterproof/drainage structure include vibration devices vibrating the drainage channel. In this case, it is possible to forcibly cause water, dust, or the like in the drainage channel to flow through vibration.

(7) It is desirable that the waterproof/drainage structure include a tank connected to the drainage hole. In this case, water discharged from the drainage channel is collected to the tank via the drainage hole, thereby making it possible to prevent water or the like discharged from the drainage hole from wetting or staining the surroundings.

(8) The present invention provides an electronic device including a casing having a plurality of pushbuttons provided on a surface of the casing, the casing including: a cover member forming the surface and provided with a plurality of button holes; and a button unit having the plurality of pushbuttons and a sheet portion retaining the plurality of pushbuttons at predetermined positions, the sheet portion being arranged along a back surface of the cover member and having its outer peripheral portion held in close contact with the cover member, the pushbuttons being inserted in the button holes of the cover member, wherein the sheet portion is provided with a groove-like drainage channel having a channel portion that is opposed to each of the plurality of pushbuttons and is larger than a surface area within a maximum outer periphery of the pushbuttons.

According to the present invention, water, dust, or the like entering the interior from the gap between the pushbuttons and the button holes, which are provided in the casing of the electronic device, can be efficiently discharged.

(9) The waterproof/drainage structure is including a heat generating member provided inside the casing, with a wall portion of the drainage channel being in abutment with the heat generating member.

In this case, the wall portion of the drainage channel is in abutment with the heat generating member, so the heat generating member can be cooled with water flowing in the drainage channel.

(10) The waterproof/drainage structure is including a heat generating member provided inside the casing, and a tank storing water discharged from the drainage channel, the tank being in abutment with the heat generating member. In this case, the heat generating member can be cooled by the tank.

As described above, according to the present invention, water, dust, or the like entering the interior from the gap between the pushbuttons and the button holes of the cover member can be collected to the drainage channel, which has the channel portion opposed to each pushbutton, to be efficiently discharged to the outside.

Accordingly, it is possible to prevent the stroke of the pushbuttons from being hindered by mold occurring due to water entering the space between the cover member and the button unit, dust, or the like, thereby preventing a deterioration in the operability of the pushbuttons.

DETAILED DESCRIPTION OF THE INVENTION

First Embodiment

Figure 1:
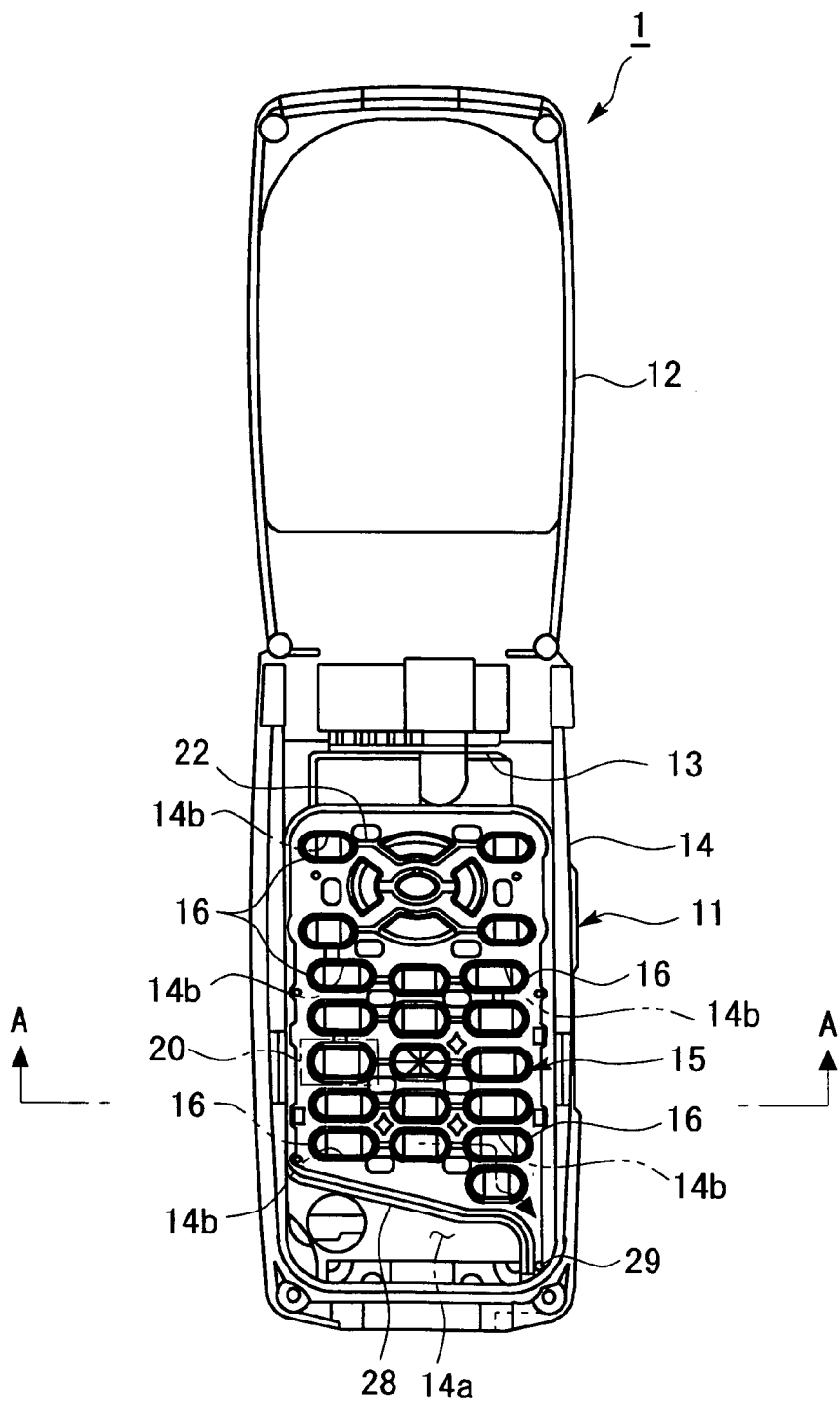
FIG. 1 is a view showing a portable telephone according to a first embodiment of the present invention.

FIG. 1 shows a portable telephone 1 as an electronic device according to a first embodiment of the present invention. The portable telephone 1 has a lower casing 11 and an upper casing 12 which are substantially rectangular and flat. One longitudinal ends of the lower casing 11 and upper casing 12 are connected to each other by devices of a hinge 13 so as to freely open and close.

Figure 2:
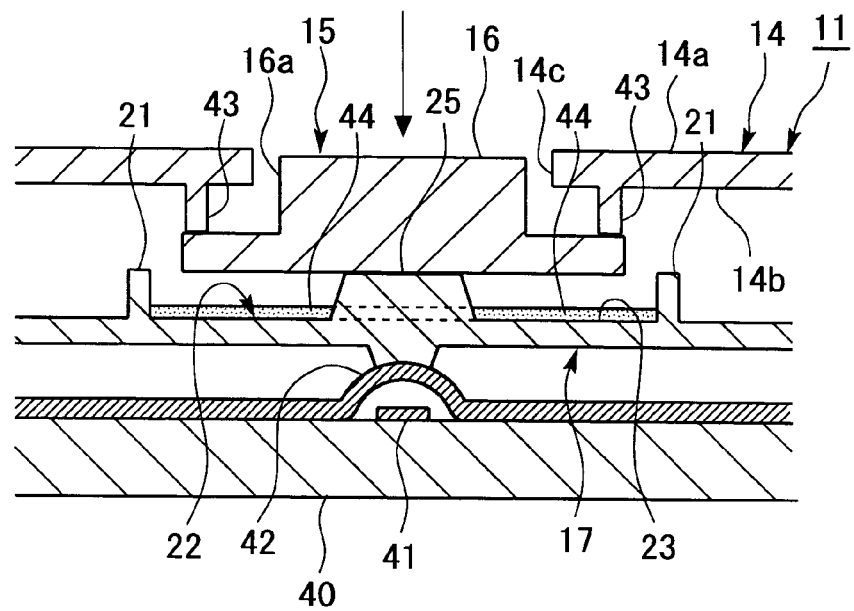
FIG. 2(a) is a view showing a pushbutton, a sheet portion, and a drainage channel according to the first embodiment of the present invention.
FIG. 2(b) is a sectional view, taken along a line A-A of FIG. 1, showing a vibrator and water repellency treatment that is performed on the drainage channel.
Figure 2:
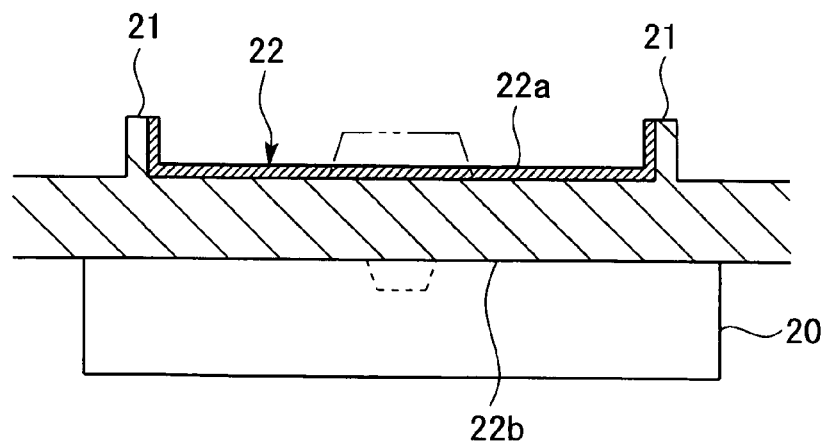

It should be noted that FIG. 1 shows a state in which an upper surface portion 14a (see FIG. 2(a)) of a cover member 14 in the lower casing 11 is removed, thus leaving a button unit 15 exposed.

A vibrator 20 as a vibrating member is provided inside the lower casing 11. The vibrator 20 abuts a bottom wall portion 22b (see FIG. 2(b)) of a drainage channel 22 in the sheet portion 17 of the button unit 15.

Further, the same circuit substrate, electronic components, and the like as those of an ordinary portable telephone are provided inside the lower casing 11. It should be noted that those circuit substrate and electronic components may be commonly used ones and thus detailed description thereof will be omitted.

As shown in FIG. 2(a), the lower casing 11 has a box-like cover member 14 forming the outer surface of the lower casing 11, and a button unit 15 arranged along a back surface 14b of the upper surface portion 14a of the cover member 14.

It should be noted that in FIG. 2(a), reference numeral 40 denotes a substrate, 41 a circuit, 42 a dome-shaped metal sheet having conductivity, and 43 a support member protruding inwards from the upper surface portion 14a of the cover member 14.

The support portion 43 is separably in pressure-contact with a side end portion of a pushbutton 16 of the button unit 15. When the pushbutton 16 is depressed, a gap is produced between the side end portion of the pushbutton 16 and the support portion 43.

As shown in FIG. 2(b), water repellency treatment 22a is performed on the inner surface of the drainage channel 22. Examples of the water repellency treatment include application of various water repellency agents, such as coatings or waxes of Teflon® or fluororesin.

Figure 3:
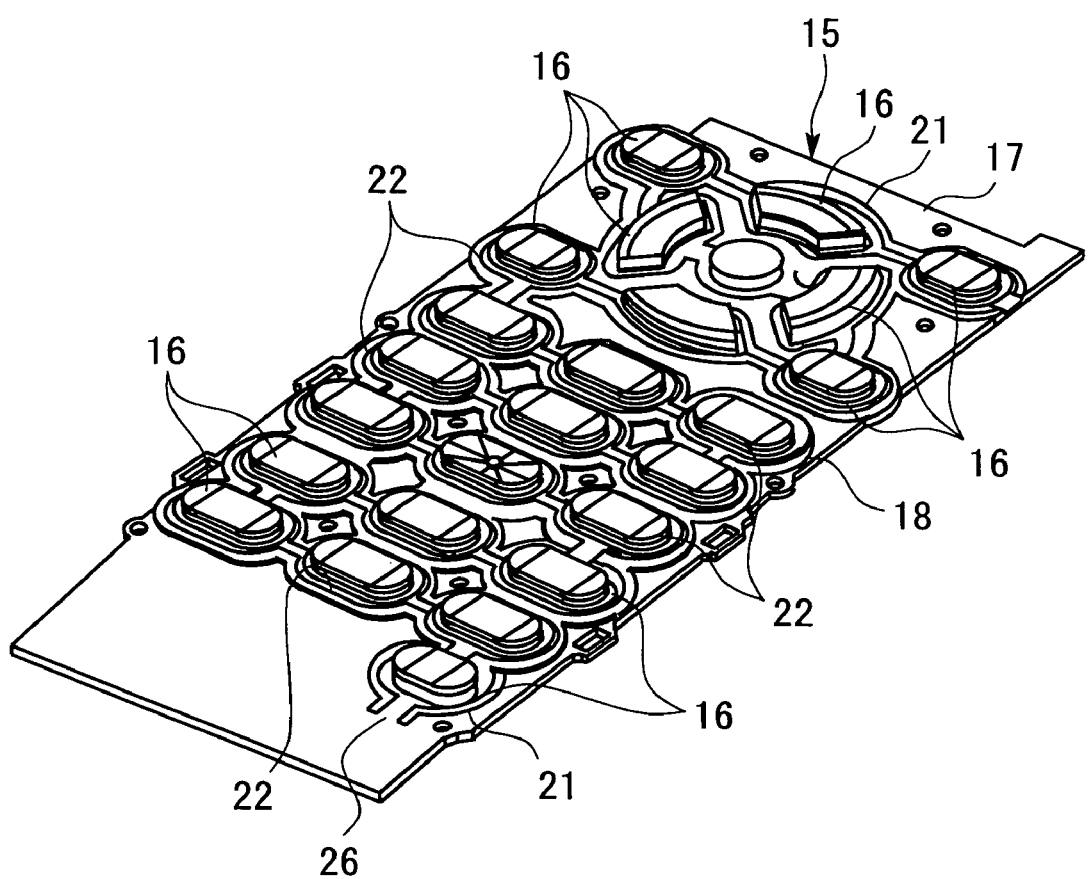
FIG. 3 is a perspective view showing a button unit according to the first embodiment of the present invention.

As shown in FIG. 3, the button unit 15 has a plurality of the pushbuttons 16 arranged at predetermined positions, and a substantially rectangular sheet portion 17 retaining the pushbuttons 16. The sheet portion 17 is formed of rubber.

Further, the configuration and size of the sheet portion 17 are determined according to the configuration and size of the lower casing 11. The pushbuttons 16 are placed on the sheet portion 17.

As shown in FIG. 2(a), when each pushbutton 16 of the button unit 15 is depressed, the dome-shaped metal sheet 42 undergoes elastic deformation to be brought into electrical connection with the circuit 41. Thus, operation corresponding to the manipulation of the pushbutton 16 can be performed.

Figure 4:
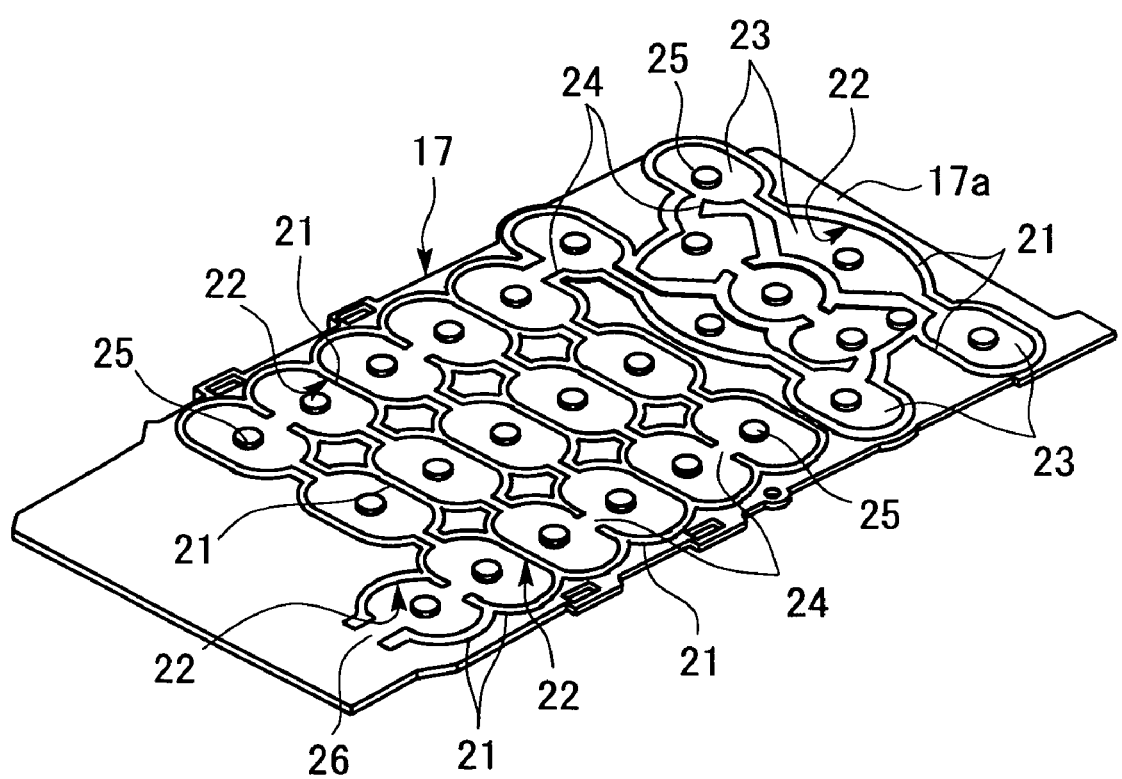
FIG. 4 is a perspective view showing the sheet portion and the drainage channel according to the first embodiment of the present invention.

FIG. 4 shows a state in which the pushbuttons 16 on the sheet portion 17 are removed. The sheet portion 17 is provided with the drainage channel 22 surrounded by elongated protrusions 21 protruding on the button-placing surface of the sheet portion 17.

The drainage channel 22 has substantially oblong or sector-shaped wide channel portions 23 opposed to each of the plurality of pushbuttons 16 and having a channel surface area larger than the surface area within the maximum outer periphery of the pushbuttons 16, and narrow connection channel portions 24 connecting the plurality of wide channel portions 23 to one another.

That is, the wide channel portion 23 is formed by the dike-like protrusion 21 surrounding the pushbutton 16 at a position on an outer side with respect to the maximum outer periphery of the pushbutton 16. A protrusion 25 placing the pushbutton 16 thereon is provided at the center of the wide channel portion 23.

Figure 5:
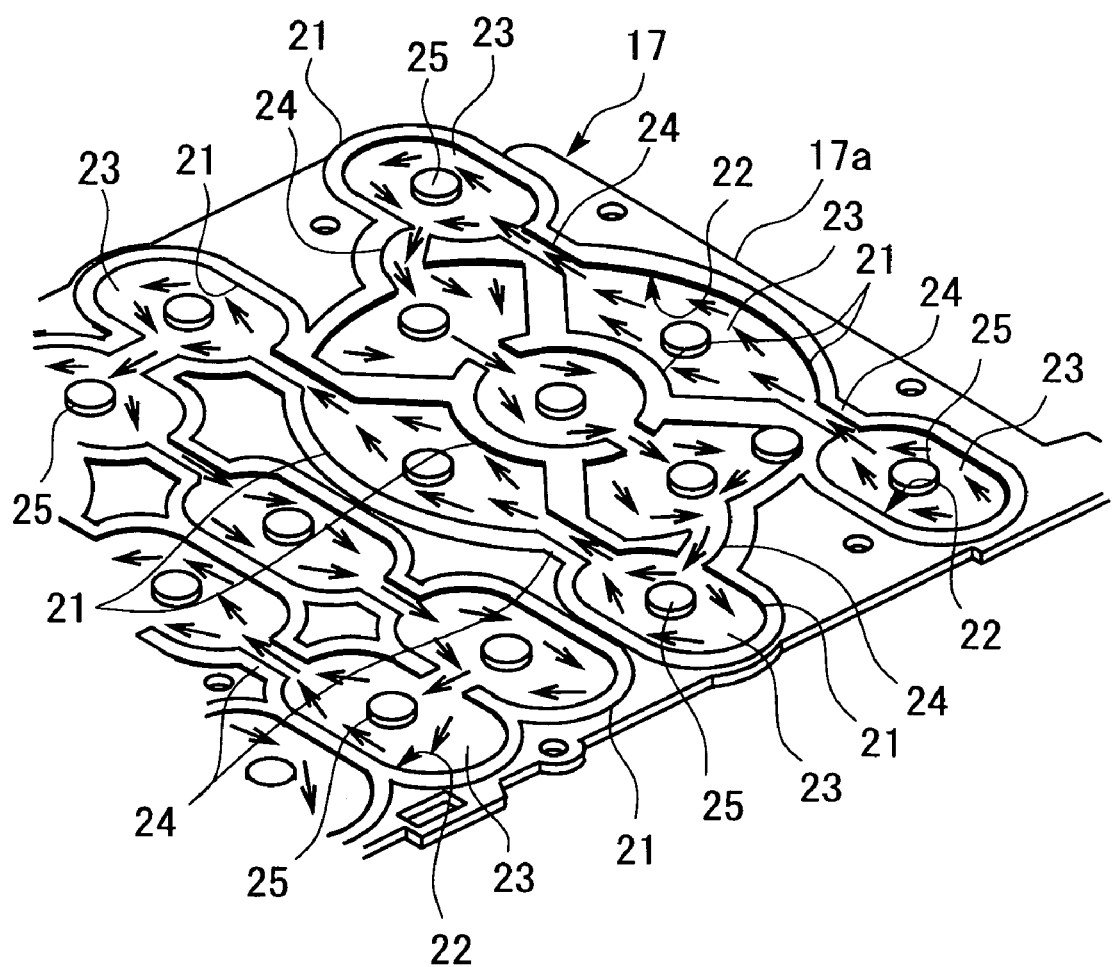
FIG. 5 is a perspective view showing a part of the drainage channel according to the first embodiment of the present invention.
Figure 6:
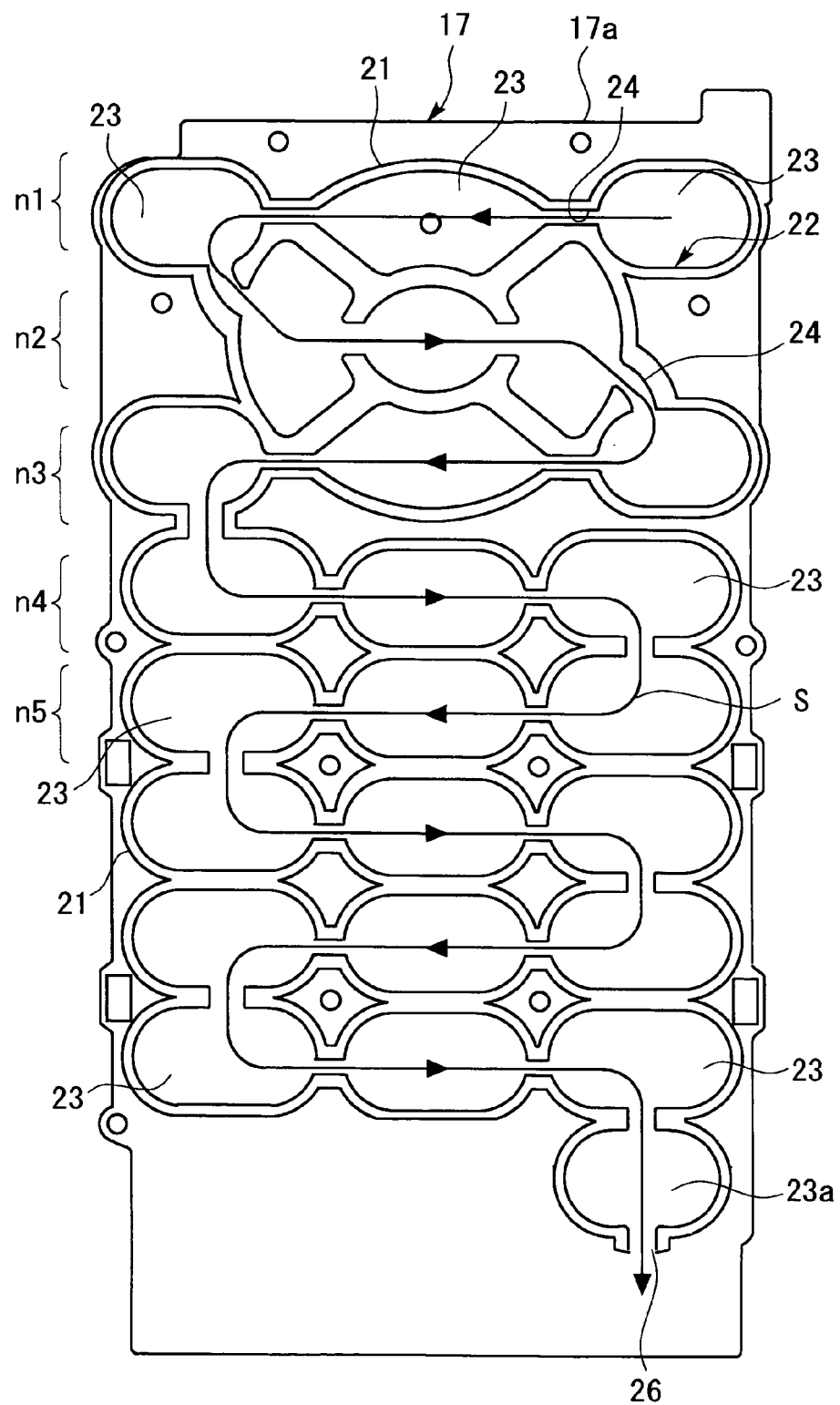
FIG. 6 is a view illustrating how the draining channel according to the first embodiment of the present invention is formed so as to be drawn in one stroke.

In this example, as indicated by the arrows of FIGS. 5 and 6, the path connecting all the wide channel portions 23 and connection channel portions 24 which are included in the drainage channel 22 is formed such that it is drawn in one stroke. That is, as shown in FIG. 6, the wide channel portions 23 and the connection channel portions 24 are connected in a continuous manner so that the path connecting all the wide channel portions 23 and connection channel portions 24 of the drainage channel 22 can be drawn as a single line S.

In this example, three wide channel portions 23 are arranged in a row n1 along a short side 17a of the sheet portion 17. Further, there are provided a plurality of rows n1, n2 ... each composed of the three wide channel portions 23.

It should be noted that the configuration of the wide channel portion 23 in each of the rows n1, n2 ... is similar to the configuration of an outer peripheral edge 16a (see FIG. 2(a)) of the pushbutton 16.

Further, in each two rows n1 and n2, n2 and n3, ..., which are arranged in a vertical relationship to each other as seen in FIG. 6, the wide channel portion 23 on one end and the wide channel portion 23 on the other end are alternately connected to each other.

For example, in the case where the wide channel portions 23, 23 at the left ends of the first and second rows n1 and n2, respectively, are connected to each other, the wide channel portions 23, 23 at the right ends of the second and third rows n2 and n3, respectively, are connected to each other.

Further, the wide channel portions 23, 23 at the left ends of the third and fourth rows n3 and n4 are connected to each other. Thereafter, the wide channel portions 23 of all the rows are connected together in the same manner so as to draw the single line S.

Figure 7:
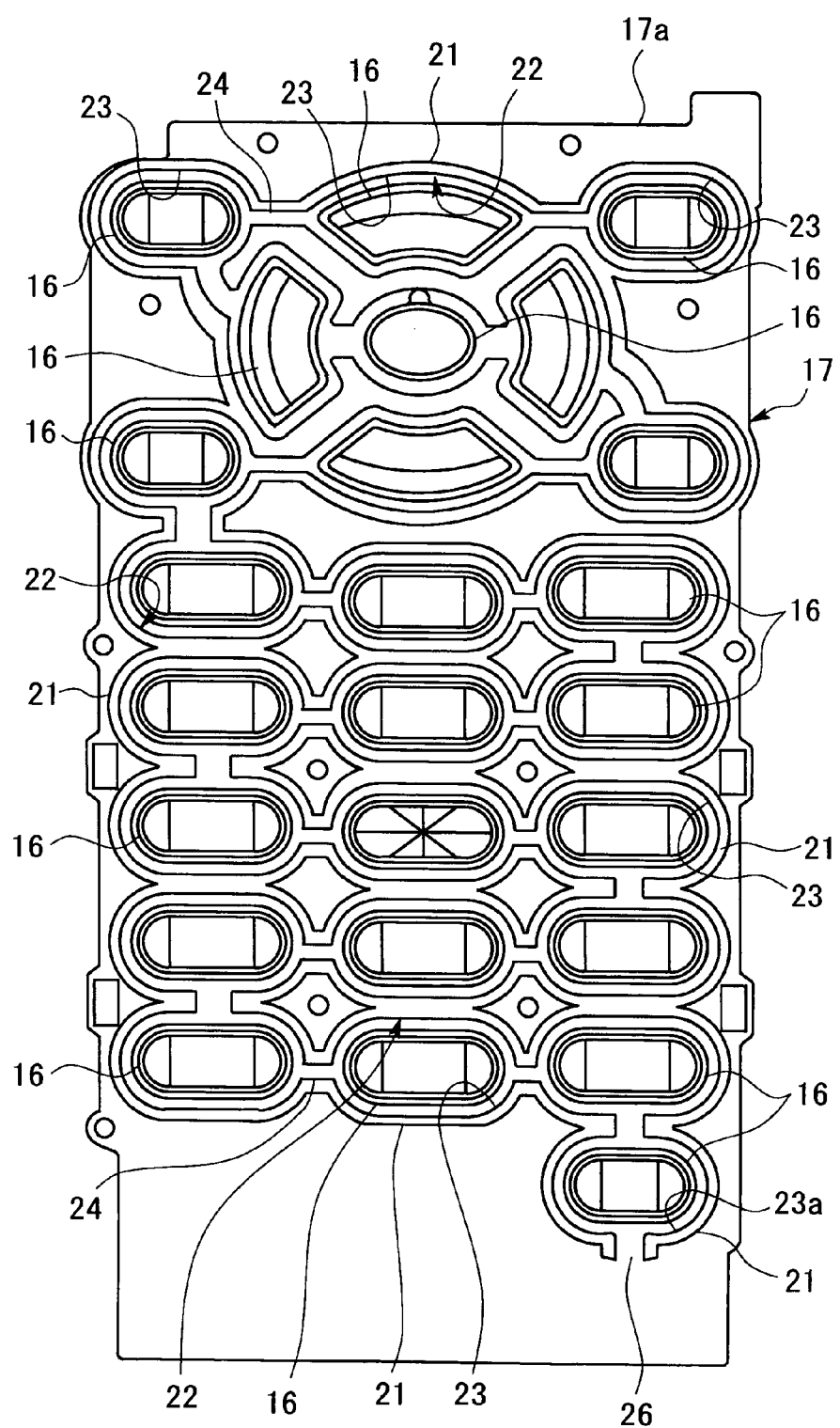
FIG. 7 is a plan view showing the button unit according to the first embodiment of the present invention.

FIG. 7 is a top view showing a state in which the pushbutton 16 is arranged inside each wide channel portion 23 in the drainage channel 22 of the sheet portion 17. As shown in FIG. 2(a), the area of the wide channel portion 23 of the drainage channel 22 extends slightly outwards beyond the outer peripheral edge 16a defining the maximum outer periphery of the pushbutton 16.

Accordingly, as shown in FIG. 2(a), water, dust, or the like entering from the gap between the outer peripheral edge 16a of the pushbutton 16 and a button hole 14c of the cover member 14 falls into the wide channel portion 23 of the drainage channel 22.

Further, as shown in FIG. 7, a wide channel portion 23a provided at one end portion (the lower end portion in FIG. 7) of the drainage channel 22 is provided with a channel outlet 26 that is open to the outside of the sheet portion 17.

Figure 8:
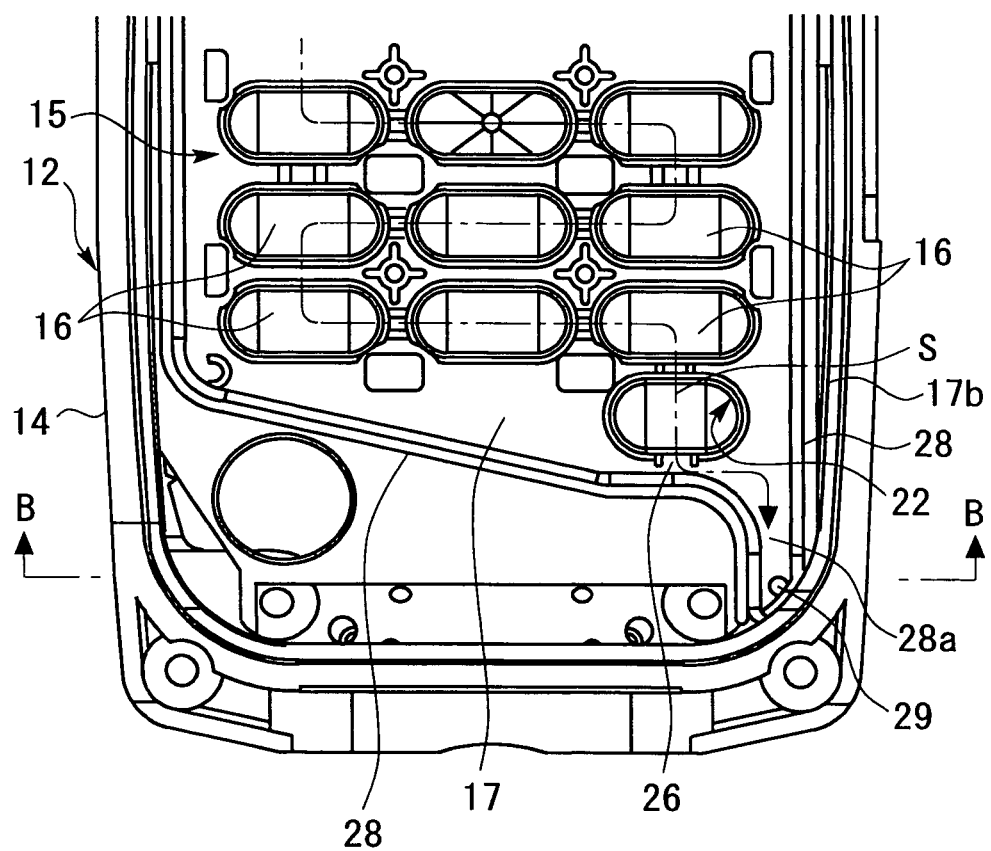
FIG. 8 is a view showing a lower end portion and a drainage hole in a lower casing according to the first embodiment of the present invention.

FIG. 8 is a top view of the button unit 15 provided in the lower casing 11. In the button unit 15, an elongated rubber packing 28 is provided on the sheet portion 17 along an outer peripheral portion 17b of the sheet portion 17. The rubber packing 28 surrounds all of the pushbuttons 16. It is thus possible to prevent water, dust, or the like that has entered a space outside the drainage channel 22 from leaking to the outside from the rubber packing 28.

Further, the water outlet 26 of the drainage channel 22 provided in the sheet portion 17 is open within the area surrounded by the rubber packing 28.

The area surrounded by the rubber packing 28 is constricted on one end portion side (the lower end portion side shown in FIG. 8) of the lower casing 11. A drainage hole 29 is provided at a position of the sheet portion 17 corresponding to the constricted portion 28a. The drainage hole 29 can be provided in a part of a boss for a screw hole mounting the cover member 14 or the like of the lower casing 11. Further, the drainage hole 29 can be provided at any suitable position.

Figure 9:
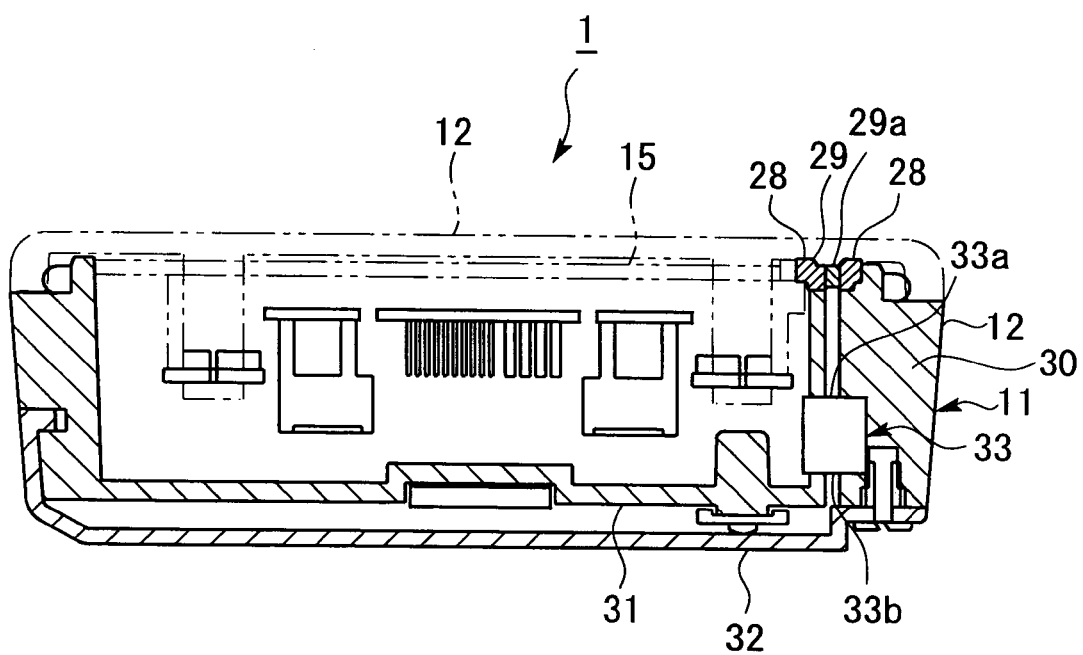
FIG. 9 is a view of the drainage hole according to the first embodiment of the present invention, showing a cross section taken along a line B-B of FIG. 8.

As shown in FIG. 9, the drainage hole 29 extends through a thick-walled portion 30 in a side portion of the lower casing 11 to reach a bottom surface 31 of the lower casing 11. A lid 29a is provided to the drainage hole 29 so as to be freely opened and closed. A water storage tank 33, which is detachably provided inside the lower casing 11, is connected to an intermediate portion of the drainage hole 29. It should be noted that reference numeral 32 in FIG. 9 denotes a battery cover.

Water or the like discharged from the channel outlet 26 of the drainage channel 22 flows on the inner side of the rubber packing 28 on the sheet portion 17 to be discharged from the drainage hole 29. The water or the like discharged from the drainage hole 29 is stored in the water storage tank 33.

Figure 10:
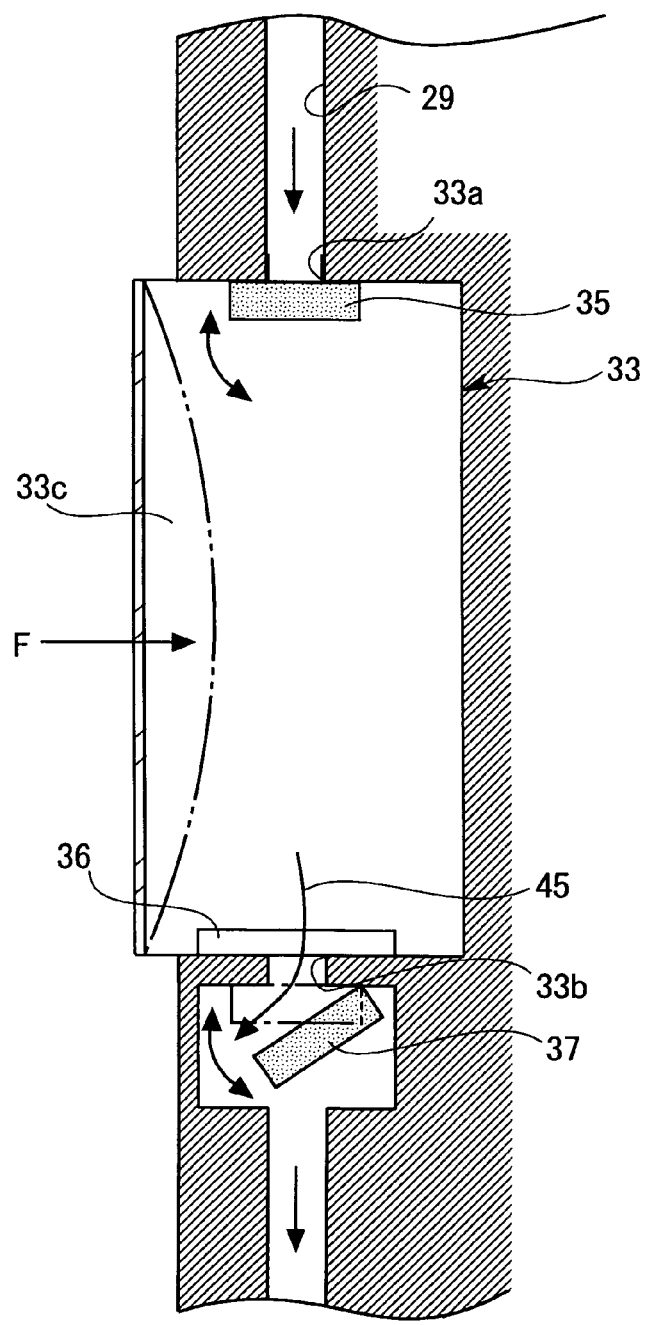
FIG. 10 is a sectional view showing a water storage tank according to the first embodiment of the present invention.

As shown in FIG. 10, the water storage tank 33 is formed in a cylindrical configuration from a material having elasticity.

It should be noted that examples of the material having elasticity include polyester elastomer, polyolefinelastomer, polychloroprene, chlorine-based polyethylene, fluororubber, ethylen-propylene rubber (EPDM), styrene-butadiene rubber (SBR), and acrylonitrile-butadiene Rubber (NBR).

Further, thermoplastic resin is an example of a material whose elasticity can be secured by making it thin. Examples of such thermoplastic resin include acrylonitrile-butadiene-stylene resin (ABS), polycarbonate resin (PC), polycarbonate/acrylonitrile-butadiene-stylene resin (PC-ABS), polyamide resin (PA), polyoxymethylene resin (POM), polyphenylene sulphide resin (PPS), polyethylene resin (PE), and polyethylene terephthalate resin (PET).

Provided at opposite ends of the water storage tank 33 are an inlet 33a and an outlet 33b each connected to the drainage hole 29. The inlet 33a is arranged on the button unit 15 side, and the outlet 33b is arranged on the bottom surface 31 side of the lower casing 11.

check valve 35 is provided on the inlet 33a side of the water storage tank 33. It is thus possible to prevent back flow of water or the like in the water storage tank 33 to the button unit 15 side.

Further, a waterproof sheet 36 and a check valve 37 are provided on the outlet side 33b of the water storage tank 33. The waterproof sheet 36 is formed of a material that does not permit passage of water and allows only air to pass therethrough.

The water storage tank 33 undergoes elastic deformation when applied with a predetermined pressing force F from the outside, causing air 45 inside the water storage tank 33 to be compressed. The resulting pressure of the air 45 causes the check valve 37 to open, so the air 45 inside the water storage tank 33 is discharged from the outlet 33b.

At this time, it is possible to prevent discharge of water in the water storage tank 33 by the waterproof sheet 36. That is, water, dust or the like in the water storage tank 33 gradually increases as long as it is not forcibly discharged.

Figure 11:
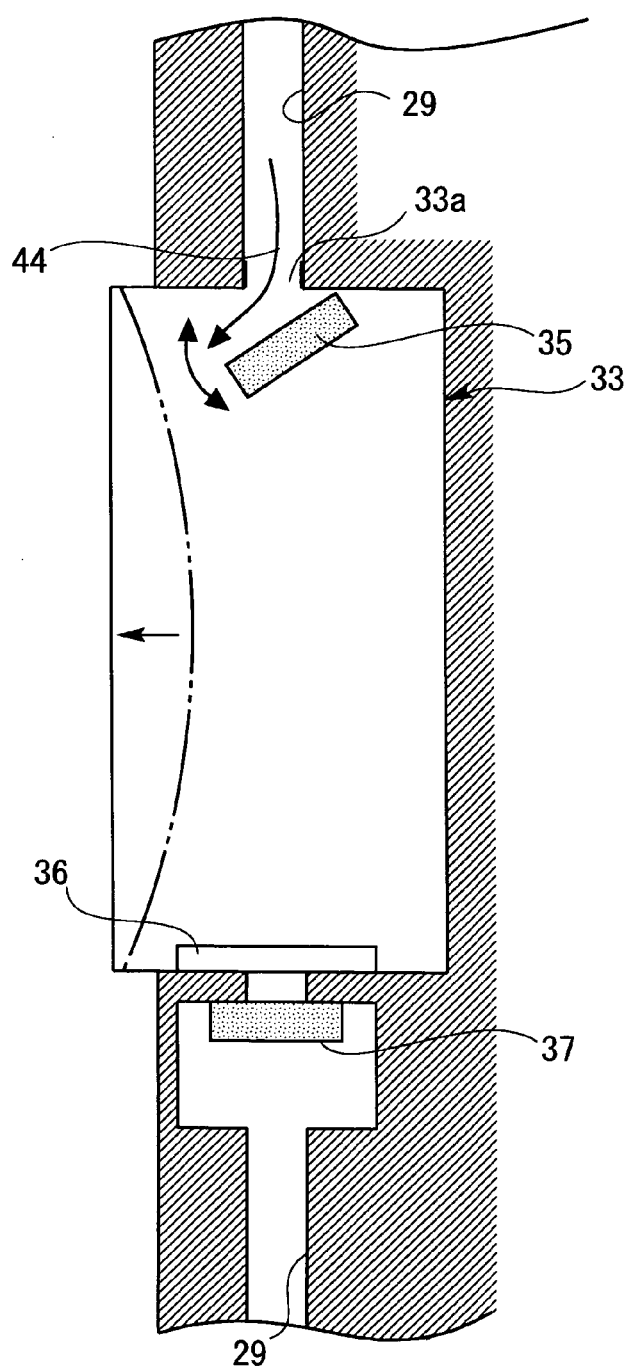
FIG. 11 is a perspective view showing a state in which water can be stored in the water storage tank according to the first embodiment of the present invention.

Further, as shown in FIG. 11, when the predetermined pressing force F exerted on the water storage tank 33 is removed, the water storage tank 33 undergoes elastic restoration so its internal air pressure decreases. This causes water, dust, or the like in the drainage channel 22 to be forcibly sucked into the water storage tank 33 through the drainage hole 29 connected to the inlet 33a of the water storage tank 33.

As a result, water, dust, or the like entering the space between the sheet portion 17 of the button unit 15 and the upper surface portion 14a of the cover member 14 can be forcibly discharged into the water storage tank 33. It should be noted that the check valve 37 at the outlet 33b is closed at this time.

As shown in FIG. 10, the water storage tank 33 is provided with a checking portion 33c checking water or the like in the interior. The checking portion 33c is formed of transparent resin. In this example, the checking portion 33c is formed in the entirety of one surface of the water storage tank 33. The checking portion 33c is arranged at a position allowing checking from outside the lower casing 11.

It should be noted that the checking portion 33c can be formed in a part or in the entirety of one surface of the water storage tank 33. Further, not only a transparent window but also a sensor for detecting the amount of water can be used for the checking portion.

As described above, in the portable telephone 1 of the present invention, the sheet portion 17 retaining the pushbuttons 16 is provided with the groove-like drainage channel 22 having the wide channel portions 23 opposed to the pushbuttons 16 and that surface area is larger than the surface area within the maximum outer periphery of the pushbuttons 16, so water 44, dust, or the like that has entered the space between the upper surface portion 14a of the covermember 14 and the sheet portion 17 is collected to the drainage channel 22.

As a result, it is possible to prevent the water 44, dust, or the like from scattering over a wide area on the sheet portion 17. Further, the water 44, foreign matter, or the like can be efficiently discharged to the outside. Accordingly, it is possible to prevent the stroke of the pushbutton 16 from being hindered by mold occurring due to the water 44, dust, or the like. This makes it possible to prevent a deterioration in the operativity of the pushbutton 16.

It should be noted that while in the above-described embodiment the water storage tank 33 is provided inside the lower casing 11, the water storage tank 33 can be provided outside the lower casing 11. In this case, a lid is covered over the drainage hole 29, with the lid being opened at the time of drainage to connect the water storage tank 33 to the drainage hole 29.

Further, as described above, the drainage channel 22 has the wide channel portions 23 opposed to the plurality of pushbuttons 16, and the connection channel portions 24 connecting those wide channel portions 23 to one another. Further, the wide channel portions 23 and the connection channel portions 24 are formed such that the path connecting those channel portions 23, 24 together can be drawn in one stroke.

Accordingly, there is no dead-end portion in the midstream of the drainage channel 22 so that the water 44, dust, or the like collected into the drainage channel 22 is reliably discharged to the outside without remaining somewhere in the midstream of the drainage channel 22.

It should be noted that an openable/closable lid is preferably provided to the drainage hole 29. The lid is opened only when discharging the water 44 or the like from the drainage hole 29 and is closed the rest of the time. This makes it possible to prevent water, dust, or the like from entering the lower casing 11 through the drainage hole 29.

Further, the drainage channel 22 is subjected to the water repellency treatment, so the water or the like in the drainage channel 22 is repelled due to the water repellency treatment to readily flow through the drainage channel 22. Therefore, the water 44 or the like can be discharged to the outside even more efficiently.

Further, inside the lower casing 11, there is provided the vibrator 20 that abuts the bottom wall portion 22b (see FIG. 2(a)) of the drainage channel 22 in the sheet portion 17 of the button unit 15.

The drainage channel 22 is vibrated by the vibrator 20, thereby allowing the water 44, dust, or the like in the drainage channel 22 to flow even more readily. Accordingly, the water 44, dust, or the like in the drainage channel 22 can be discharged even more efficiently.

It should be noted that a vibrator informing arrival of a call in the form of a vibration can be used as the vibrator 20. In this case, it is preferable that the vibration mode informing arrival of a call and the vibration mode at the time of drainage be made different from each other.

Second Embodiment

Figure 12:
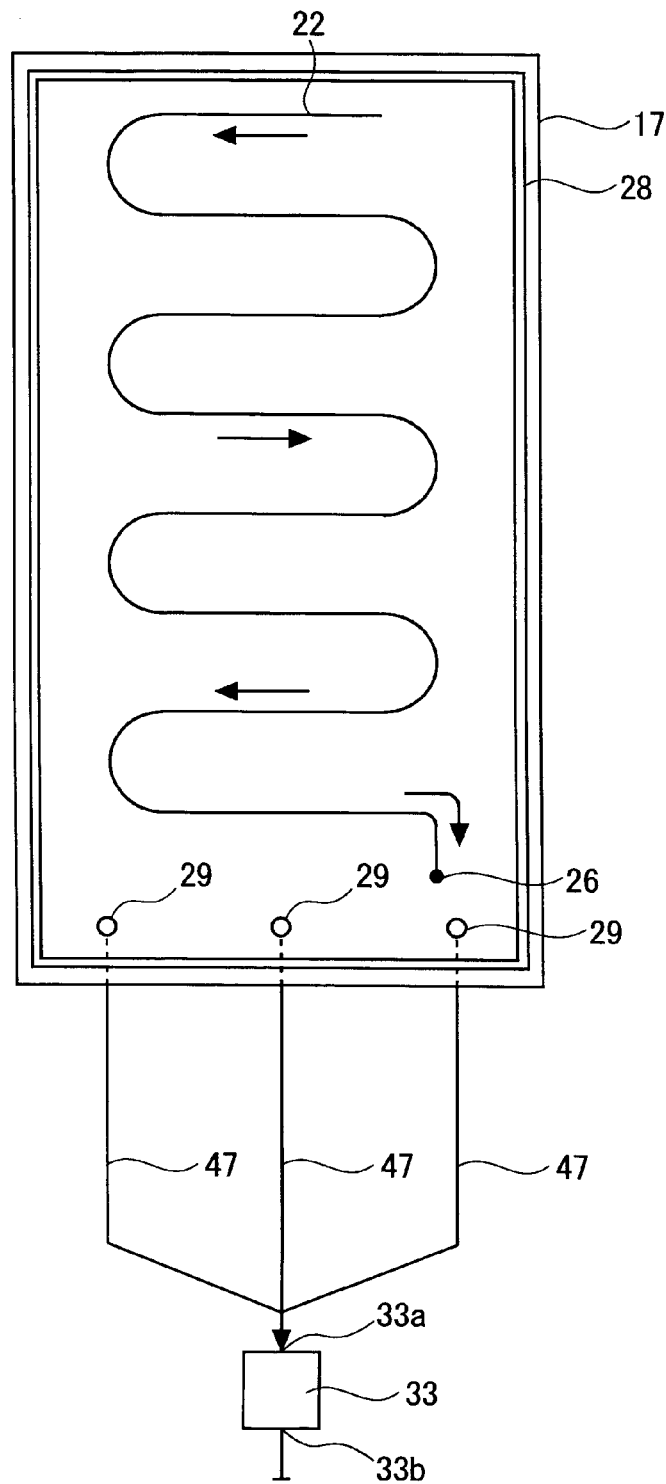
FIG. 12 is a view showing a support portion and openings according to a second embodiment of the present invention.

FIG. 12 shows a sheet portion 17 according to a second embodiment of the present invention. It should be noted that a drainage hole 22 is herein presented in the form of a linear model. Further, in the following description, portions that are similar to those of the first embodiment are denoted by the same reference numerals and detailed description thereof is omitted.

The sheet portion 17 is provided with a plurality of drainage holes 29. The drainage holes 29 are provided at suitable intervals on an end portion side (the lower side in FIG. 12) within an area surrounded by a rubber packing 28. Further, all the drainage holes 29 are connected to one inlet 33a of a water storage tank 33 through connecting portions 47.

Water, dust, or the like in the drainage channel 22 is discharged from the drainage hole 29 into the area surrounded by the rubber packing 28 on the sheet portion 17. The water, dust, or the like thus discharged is discharged into the water storage tank 33 from the plurality of drainage holes 29.

Third Embodiment

Figure 13:
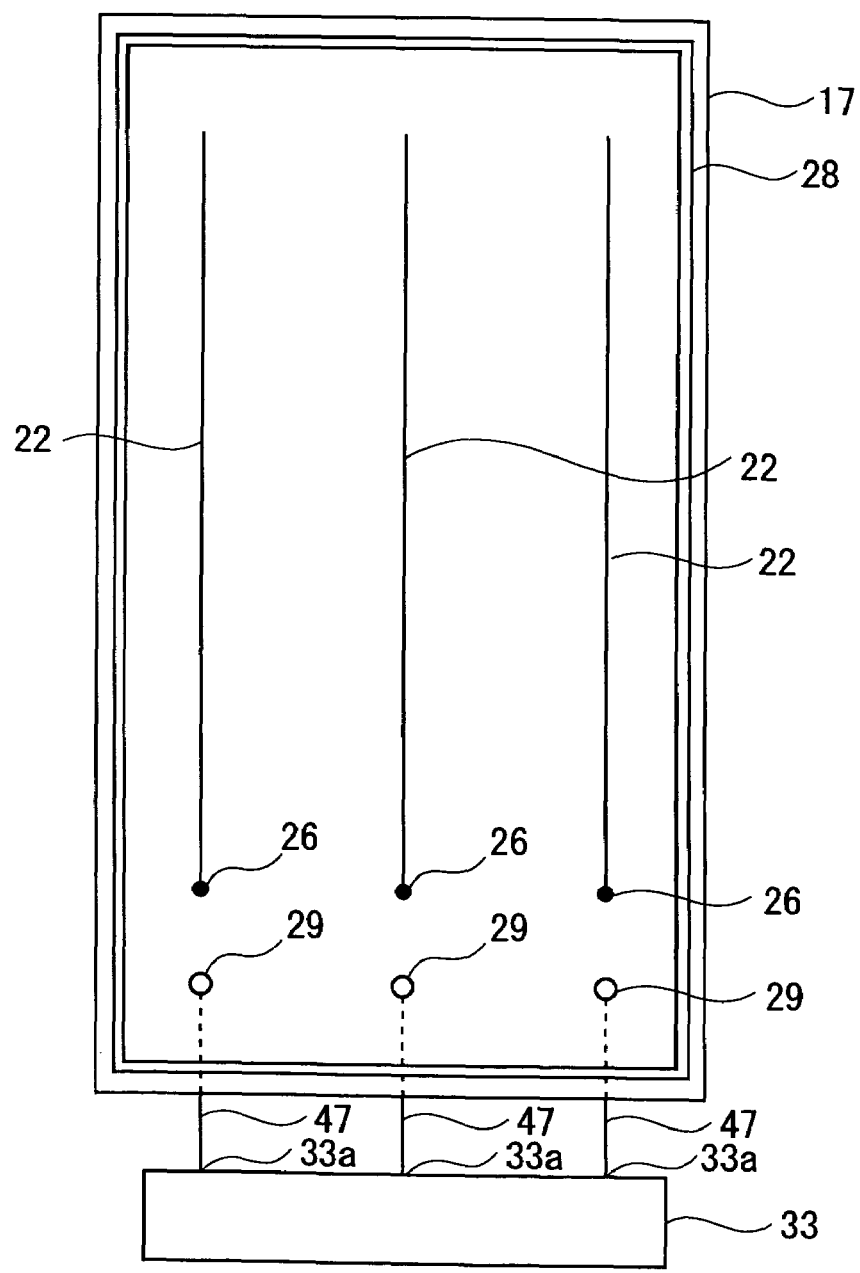
FIG. 13 is a view showing drainage channels, drainage holes, and a water storage tank according to a third embodiment of the present invention.

FIG. 13 shows a sheet portion 17 according to a third embodiment of the present invention. The sheet portion 17 is provided with a plurality of drainage channels 22. The drainage channels 22 have a plurality of wide channel portions 23 (not shown) opposed to part of all the pushbuttons 16. Further, each drainage channel 22 is formed such that the path connecting its wide channel portions 23 and connection channel portions 24 can be drawn in one stroke.

A channel outlet 26 is provided at one end of each drainage channel 22. Further, the sheet portion 17 is provided with drainage holes 29 corresponding to the respective channel outlets 26. The water storage tank 33 is provided with a plurality of inlets 33a. Further, each of the plurality of the drainage holes 29 is connected to one of the inlets 33a of the water storage tank 33.

Figure 14:
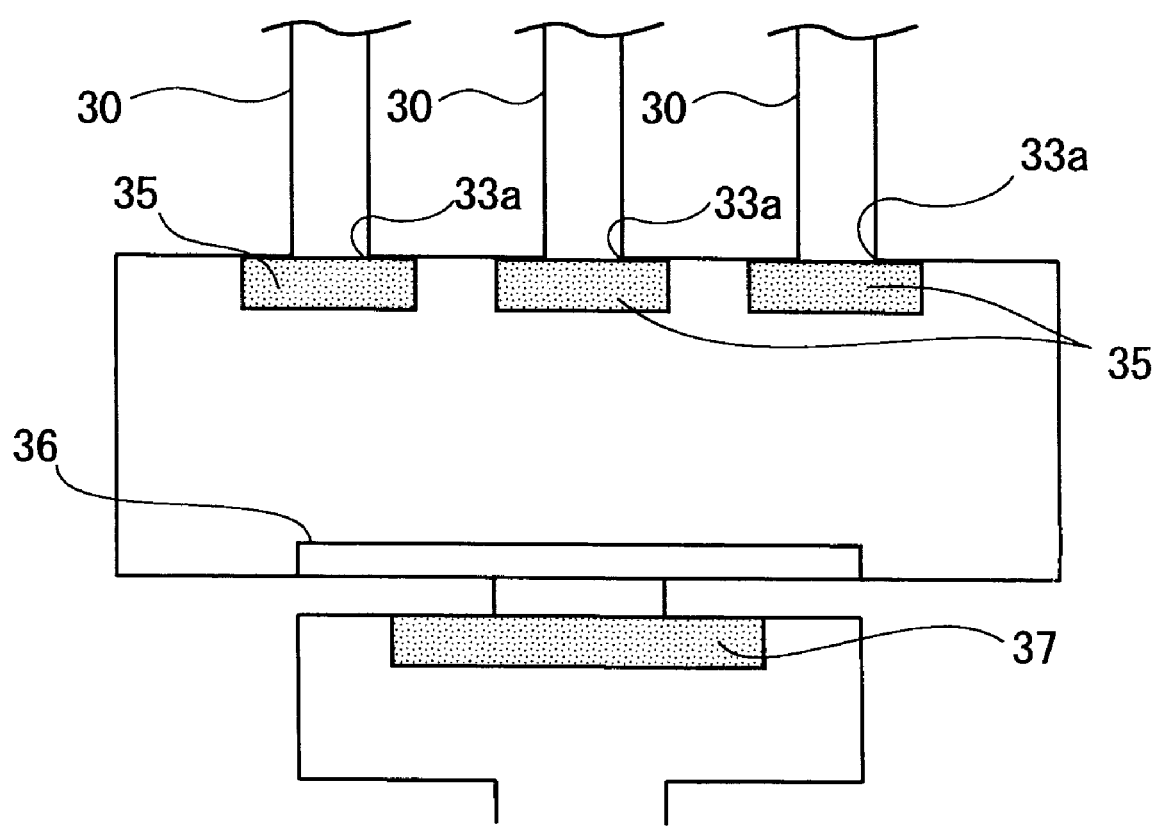
FIG. 14 is a sectional view showing a water storage tank according to a fourth embodiment of the present invention.

Further, as shown in FIG. 14, a check valve 35 is provided at each of the plurality of inlets 33a of the water storage tank 33.

Since the plurality of drainage channels 22 are provided according to the present invention, each drainage channel 22 is short as compared with the case where there is provided only one drainage channel 22. Accordingly, water, dust, or the like in each drainage channel 22 is discharged into the water storage tank 33 in a relatively short time. Further, it is possible to prevent the water, dust, or the like from remaining within the drainage channel 22.

Fourth Embodiment

Figure 15:
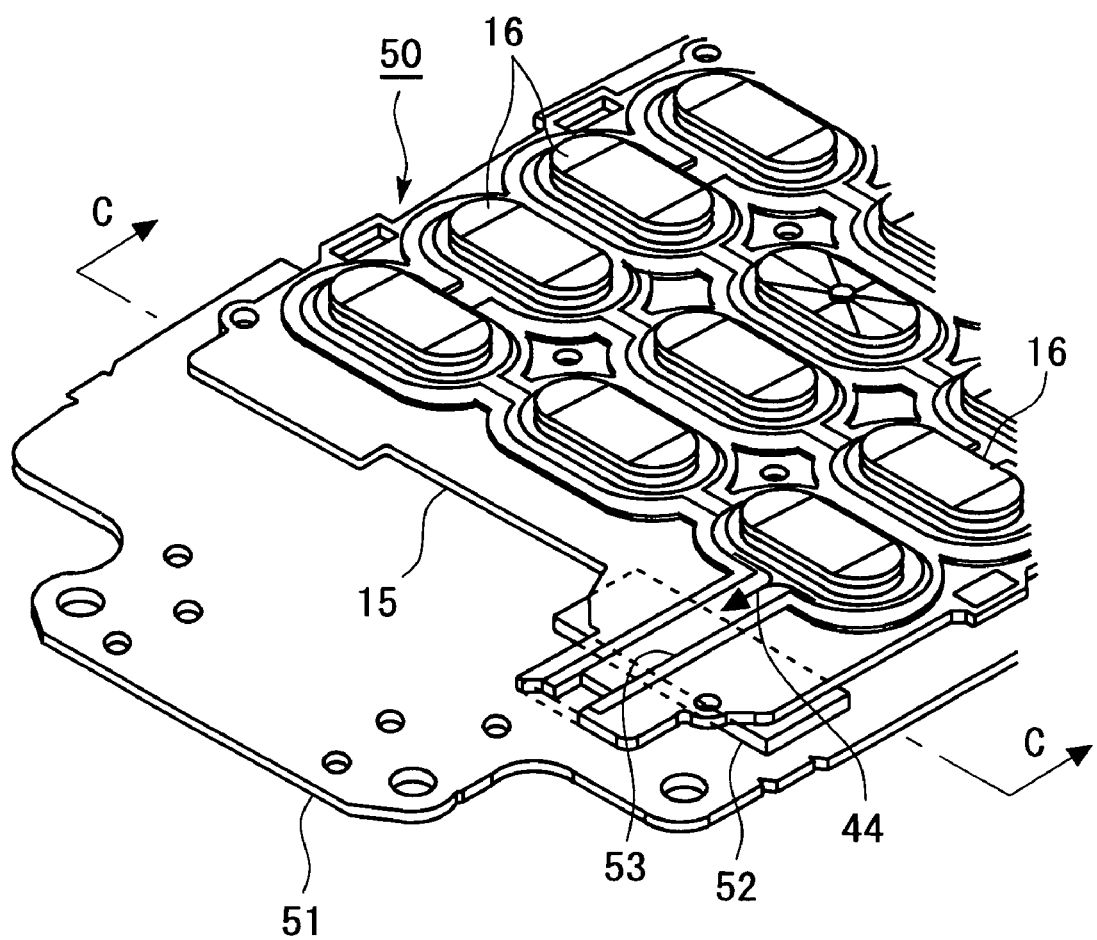
FIG. 15 is a perspective view showing a heat generating component and a button unit in an electronic device according to a fifth embodiment of the present invention.

FIG. 15 shows a substrate 51 and a button unit 15 in an electronic device 50 according to a fourth embodiment of the present invention. The substrate 51 is provided with a heat generating component 52 such as a central processing unit (CPU). A sheet portion 17 of the button unit 15 is arranged above the heat generating component 52.

Figure 16:
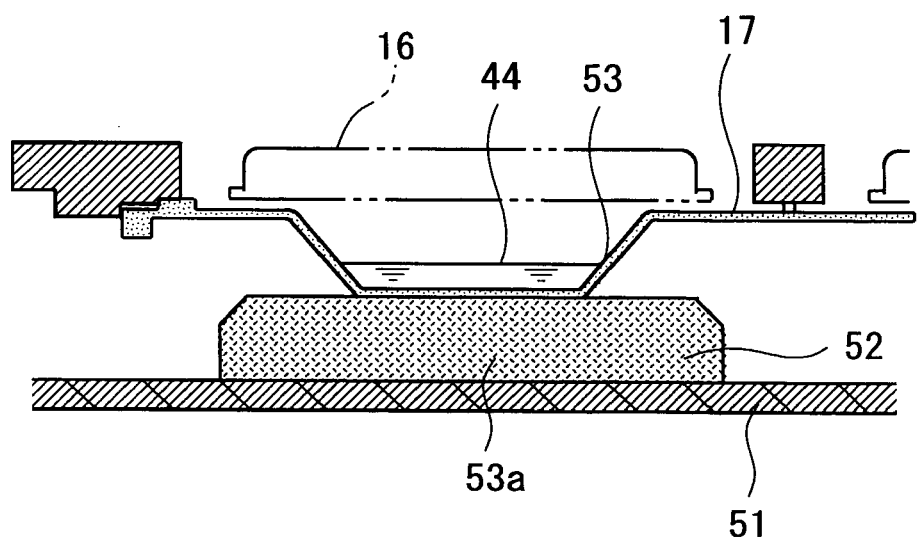
FIG. 16 is a view of the heat generating component and a drainage channel according to the fifth embodiment of the present invention, showing a cross section taken along the line C-C of FIG. 15.

As shown in FIG. 16, the sheet portion 17 arranged above the heat generating component 52 is provided with a drainage channel 53 that is the same as the drainage channel 22 of the first embodiment. That is, the drainage channel 53 is formed in the sheet portion 17 in the form of a groove. Further, as in the first embodiment, the drainage channel 53 has wide channel portions and connection channel portions. A bottom wall portion 53a of the drainage channel 53 is in abutment with the heat generating component 52.

In the electronic device 50, the heat generating component 52 is cooled with water 44 flowing in the drainage channel 53. Accordingly, there is no need to provide a special cooling member cooling the heat generating component 52. As a result, it is possible to achieve reductions in the number of components and cost.

Fifth Embodiment

Figure 17:
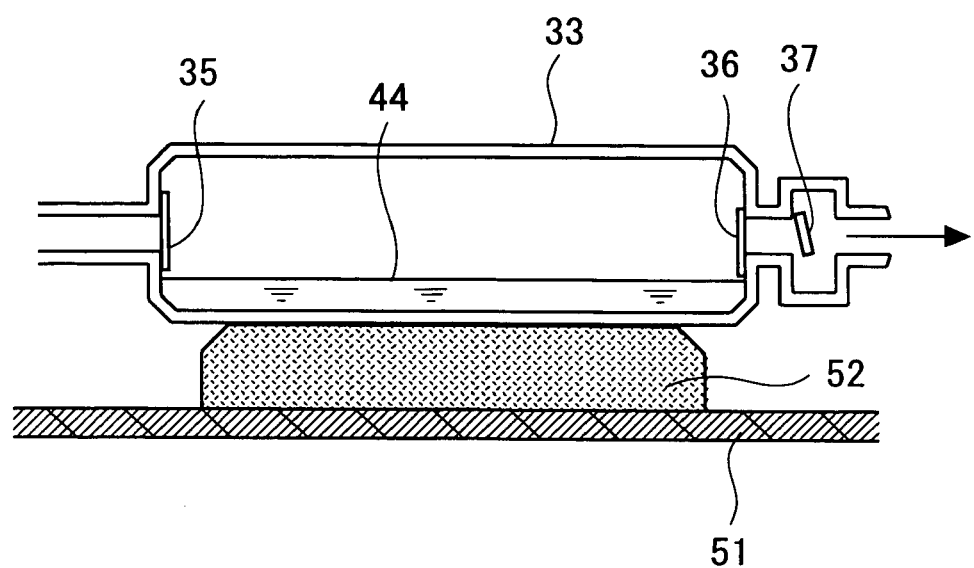
FIG. 17 is a sectional view showing a heat generating component and a drainage channel according to a sixth embodiment of the present invention.

FIG. 17 shows a water storage tank 33 according to a fifth embodiment of the present invention. The water storage tank 33 is arranged in abutment with a heat generating component 52.

According to the fifth embodiment, the heat generating component 52 is cooled with water 44 stored in the water storage tank 33. As a result, it is possible to achieve reductions in the number of components and cost.

Others

The disclosures of Japanese patent application No. JP2005-252363 filed on Aug. 31, 2005 including the specification, drawings and abstract are incorporated herein by reference.

What is claimed is:

1. A waterproof/drainage structure for a casing having a plurality of pushbuttons on a surface of the casing, comprising:

a cover member forming the surface and provided with a plurality of button holes; and a button unit having the plurality of pushbuttons and a sheet portion retaining the plurality of pushbuttons at predetermined positions, the sheet portion being arranged along a back surface of the cover member and having an outer peripheral portion held in close abut with the cover member, the pushbuttons being inserted in the button holes of the cover member, wherein the sheet portion is provided with a groove-like drainage channel having a channel portion that is opposed to a back surface of each of the plurality of pushbuttons and is larger than a surface area within a maximum outer periphery of the pushbuttons.

2. A waterproof/drainage structure for a casing of claim 1, wherein the drainage channel has: wide channel portions that are respectively opposed to the plurality of pushbuttons and are larger than the maximum outer periphery of the pushbuttons; and connection channel portions connecting the wide channel portions to one another, the wide channel portions and the connection channel portions being formed so that the wide channel portions and the connection channel portions are drawn in one stroke.

3. A waterproof/drainage structure for a casing of claim 1, wherein the groove-like drainage channel is formed by a protrusion protruding on the sheet portion.

4. A waterproof/drainage structure for a casing of claim 1, wherein the sheet portion is provided with a drainage hole discharging water exiting the drainage channel, the drainage hole being provided with a lid that can be freely opened and closed.

5. A waterproof/drainage structure for a casing of claim 1, wherein the drainage channel is subjected to water repellency treatment.

6. A waterproof/drainage structure for a casing of claim 1, comprising vibration devices vibrating the drainage channel.

7. A waterproof/drainage structure for a casing of claim 1, comprising a tank connected to the drainage hole.

8. A waterproof/drainage structure for a casing of claim 7, comprising a plurality of the drainage holes which are each connected to the tank.

9. A waterproof/drainage structure for a casing of claim 8, wherein the tank has a plurality of connection ports respectively connected to the plurality of drainage holes, the check valve being provided at each of the plurality of connection ports.

10. A waterproof/drainage structure for a casing of claim 7, wherein: the drainage channel is divided into a plurality of drainage channels; a path connecting the wide channel portions and the connection channel portions in each of the plurality of the drainage channels is formed so that the path is drawn in one stroke; and the plurality of the drainage channels are each connected to the tank.

11. A waterproof/drainage structure for a casing of claim 7, wherein the tank has elasticity.

12. A waterproof/drainage structure for a casing of claim 10, wherein:
when the tank is pressed, the check valve at the exhaust port is opened and the check valve at each of the connection ports is closed, causing air in the tank to be exhausted to the outside from the exhaust port; and
when the tank is not pressed, the check valve at each of the connection ports is opened and the check value at the exhaust port is closed, causing water in the drainage channel to be sucked into the tank.

13. A waterproof/drainage structure for a casing of claim 7, wherein:
the tank has a plurality of connection ports connected to the drainage hole, and an exhaust port discharging air in the tank to an outside; and
the plurality of connection ports and the exhaust port are each provided with a check valve.

14. A waterproof/drainage structure for a casing of claim 13, wherein the exhaust port is provided with a filter that does not permit passage of water and permits passage of air.

15. A waterproof/drainage structure for a casing of claim 7, wherein the tank has a checking portion checking an inner portion of the tank.

16. An electronic device comprising a casing having a plurality of pushbuttons provided on a surface of the casing, the casing including:
a cover member forming the surface and provided with a plurality of button holes; and
a button unit having the plurality of pushbuttons and a sheet portion retaining the plurality of pushbuttons at predetermined positions, the sheet portion being arranged along a back surface of the cover member and having an outer peripheral portion of the sheet portion held in close contact with the cover member, the pushbuttons being inserted in the button holes of the cover member,
wherein the sheet portion is provided with a groove-like drainage channel having a channel portion that is opposed to each of the plurality of pushbuttons and is larger than a surface area within a maximum outer periphery of the pushbuttons.

17. An electronic device of claim 16, comprising a heat generating member provided inside the casing, wherein a wall portion of the drainage channel is in abutment with the heat generating member.

18. An electronic device of claim 16, comprising a heat generating member provided inside the casing, and a tank storing water discharged from the drainage channel, wherein the tank is in abutment with the heat generating member.

* * * * *